United States Patent
Backhouse et al.

(10) Patent No.: US 7,509,638 B2
(45) Date of Patent: Mar. 24, 2009

(54) METHOD AND APPARATUS FOR PROVIDING A PLUGGABLE AND EXTENDABLE J2EE ARCHITECTURE

(75) Inventors: Richard Andrew Backhouse, Apex, NC (US); David N. Brauneis, Jr., Raleigh, NC (US); Brent Hames Daniel, Morrisville, NC (US); Christopher Creighton Mitchell, Raleigh, NC (US); Ramya Ramakrishnan, Gaithersburg, MD (US)

(73) Assignee: International Business Machines Corporation, Armonk, NY (US)

(*) Notice: Subject to any disclaimer, the term of this patent is extended or adjusted under 35 U.S.C. 154(b) by 996 days.

(21) Appl. No.: 10/909,861

(22) Filed: Aug. 2, 2004

(65) Prior Publication Data

US 2006/0026591 A1 Feb. 2, 2006

(51) Int. Cl.
*G06F 9/445* (2006.01)
*G06F 9/45* (2006.01)

(52) U.S. Cl. .................................. 717/177; 717/176
(58) Field of Classification Search ................ 717/176, 717/177
See application file for complete search history.

(56) References Cited

U.S. PATENT DOCUMENTS

| 6,513,152 | B1 | 1/2003 | Branson et al. ............. 717/100 |
|---|---|---|---|
| 2003/0014554 | A1 | 1/2003 | Williamson et al. ......... 709/313 |
| 2003/0023752 | A1 | 1/2003 | Williamson et al. ......... 709/245 |
| 2003/0110312 | A1 | 6/2003 | Gunduc et al. .............. 709/328 |
| 2003/0158895 | A1 | 8/2003 | Mehra et al. ................ 709/203 |
| 2003/0225944 | A1 | 12/2003 | Mousseau et al. ............. 710/1 |
| 2003/0226136 | A1 | 12/2003 | Calahan ...................... 717/162 |
| 2004/0003119 | A1 | 1/2004 | Munir et al. ................ 709/246 |
| 2004/0003371 | A1 | 1/2004 | Coulthard et al. ........... 717/101 |
| 2004/0015380 | A1 | 1/2004 | Timmins ........................ 705/8 |
| 2004/0015859 | A1 | 1/2004 | Potter et al. ................. 717/120 |
| 2004/0019645 | A1 | 1/2004 | Goodman et al. ........... 709/206 |
| 2005/0050155 | A1* | 3/2005 | McGee et al. ............... 709/213 |

OTHER PUBLICATIONS

Bolour, Azad; "Notes on the Eclipse Plug-in Architecture"; Bolour Computing, 2003, pp. 1-30. Downloaded: www.eclipse.org/articles/Articles-Plug-in-architecture/plugin_architecture.html on Jun. 19, 2008.*

* cited by examiner

*Primary Examiner*—Li B Zhen
(74) *Attorney, Agent, or Firm*—Yee & Associates, P.C.; Bruce Clay

(57) ABSTRACT

A method and apparatus for providing a pluggable and extendable J2EE architecture are provided. The method and apparatus provide mechanisms for defining extension points within modules of the J2EE application and mechanisms for defining plug-in or extension modules that may be integrated into the J2EE application via these extension points. In addition, a mechanism for merging the plug-in or extension modules into the J2EE application at deployment is provided such that all of the information necessary for generating instantiations of the plug-in or extension modules is integrated into the J2EE application configuration files. As a result, an integrated J2EE application is made possible from a modularized and extendable development of the J2EE application.

3 Claims, 8 Drawing Sheets

```
<?xml encoding="US-ASCII"?>

<!ELEMENT plugin (requires?, extension-point*, extension*)>
<!ATTLIST plugin
   name            CDATA #REQUIRED
   id              CDATA #REQUIRED
   version         CDATA #REQUIRED
   vendor-name     CDATA #IMPLIED
   embedded              (true | false) "false"
   context-root    CDATA #IMPLIED
>
<!ELEMENT requires (import+)>
<!ELEMENT import EMPTY>
<!ATTLIST import
   plugin          CDATA #REQUIRED
   version         CDATA #IMPLIED
   match                 (exact | compatible | greaterOrEqual) #IMPLIED
>
<!ELEMENT extension-point EMPTY>
<!ATTLIST extension-point
   name            CDATA #REQUIRED
   id              CDATA #REQUIRED
   schema          CDATA #IMPLIED
>
<!ELEMENT extension ANY>
<!ATTLIST extension
   point           CDATA #REQUIRED
   id              CDATA #IMPLIED
   name            CDATA #IMPLIED
>
```

710 — plugin element block
720 — requires/import block
730 — extension-point block
740 — extension block

METHOD AND APPARATUS FOR PROVIDING A PLUGGABLE AND EXTENDABLE J2EE ARCHITECTURE

BACKGROUND OF THE INVENTION

1. Technical Field

The present invention is generally directed to a method and apparatus for providing a modular J2EE architecture. More specifically, the present invention is directed to a method and apparatus for providing a plug-in based extendable J2EE architecture.

2. Description of Related Art

Large software projects often utilize componentized development so that the project is broken into smaller pieces that can be completed by individual development teams. This reduces the complexity of the development process by isolating each development team from the affects of changes in other parts of the project. One architecture that has been developed to aid in this componentized development process is the Java 2 Platform Enterprise Edition (J2EE), available from Sun Microsystems. J2EE is a platform for building distributed enterprise applications that operate in a middle tier between the user's machine and the enterprise databases and legacy information systems. The J2EE architecture is composed of Enterprise JavaBeans (EJBs), JavaServer Pages (JSPs), Java servlets, and a variety of interfaces for linking to the information resources in the enterprise. The J2EE interfaces include Java DataBase Connectivity (JDBC) for database, Java Naming and Directory Interface (JNDI) for directories, Java Transaction API (JTA) for transactions, Java Messaging Service (JMS) for messaging, and JavaMail for e-mail systems.

The J2EE applications are typically componentized into a presentation tier, a business tier, and a data tier. The presentation tier deals with the components that represent the manner by which information is presented to a user. The business tier includes the business logic regarding how the J2EE application is to operate on requests from users via the presentation tier and on the data in the data tier. The data tier is the raw enterprise data or information, and the mechanisms for accessing this data/information, that is used as a basis for performing the operations defined by the business tier.

While J2EE was designed to promote the componentized development of applications, the J2EE model in may respects hinders the division of these tiers into multiple development components. For example, the presentation tier and the business tier are combined into a single archive file (WAR file) and are not maintained separately. While these tiers could be packaged into multiple WAR files, each WAR file would have its own configuration data and would not be able to share resources, such as a context-root or a session, with the other WAR files. Thus, there are negative consequences to forcing this separation or componentization in the J2EE model.

Another componentized architecture is the Eclipse architecture available from Bolour Computing. Eclipse is an extensible platform for building Integrated Development Environments (IDEs). Eclipse provides a core of services for controlling a set of tools working together to support programming tasks. Tool builders contribute to the Eclipse platform by wrapping their tools in pluggable components, called Eclipse plug-ins, which conform to Eclipse's plug-in contract. The basic mechanism of extensibility in Eclipse is that new plug-ins can add new processing elements to existing plug-ins and Eclipse provides a set of core plug-ins to bootstrap this process.

Even though the Eclipse platform is specialized for building IDEs, the core of its concepts and facilities supports a general model for composing an application from constituent parts developed by multiple vendors. A plug-in in Eclipse is a component that provides a certain type of service within the context of the Eclipse workbench. By a "component" what is meant is an object that may be configured into a system at system deployment time. The Eclipse runtime provides an infrastructure to support the activation and operation of a set of plug-ins working together to provide a seamless environment for development activities.

Within a running Eclipse instance, a plug-in is embodied in an instance of a plug-in runtime class, or plug-in class for short. The plug-in class provides configuration and management support for the plug-in instance. A plug-in class in Eclipse must extend org.eclipse.core.runtime.Plugin, which is an abstract class that provides generic facilities for managing plug-ins.

An Eclipse installation includes a plugins folder where individual plug-ins are deployed. Each plug-in is installed in its own folder under the plugins folder. A plug-in is described in an XML manifest file, called plugin.xml, residing in the plug-in's folder. The manifest file tells the Eclipse runtime what it needs to know to activate the plug-in.

The parsed contents of plug-in manifest files are made available programmatically through a plug-in registry API and parsed plug-in specifications are cached in an in-memory repository called the plug-in registry. The Eclipse runtime instantiates an instance of each plug-in by using the plug-in registry API. The plug-in registry API is also used by provider-supplied plug-in code to obtain information about plug-ins.

The Eclipse Platform Plug-in Manifest Specification documents the XML elements and attributes used in defining plug-ins. In the plug-in manifest file, each plug-in has a unique identifier (XML attribute id) that is used to refer to a plug-in within the manifest files of other, related, plug-ins. The unique identifier may also be used within provider-supplied plug-in code to access the plug-in's running instance.

Plug-in instances are managed by the Eclipse runtime, and are accessed by using the Eclipse platform. Plug-in instances are not constructed by application programs.

Deploying a plug-in in an Eclipse installation involves copying the resources that constitute the plug-in (the manifest file, jar files, and other resources) into an individual folder for the plug-in, under the installation's plugins directory. Such a plug-in can then be activated by the Eclipse runtime when it is required to perform some function. Activating a plug-in means loading its runtime class and instantiating and initializing its instance.

The main function of a plug-in class is to do special processing during plug-in activation and deactivation, e.g., to allocate and release resources. For simple plug-ins, no specific activation or deactivation processing is required and therefore, no specific plug-in class needs to be provided by the plug-in designer. In that case, the Eclipse runtime automatically provides a default plug-in class for the plug-in instance. When the plug-in needs to do something specific to activate or deactivate itself, the plug-in designer provides overrides for the activation and deactivation methods of the class, respectively called startup and shutdown, and includes the fully-qualified name of this specific plug-in subclass as the value of the attribute class in the corresponding plug-in manifest file.

Eclipse includes a plug-in management kernel, known as the Eclipse platform, or the Eclipse runtime, and certain core plug-ins that are present in every Eclipse deployment. The identities of these core plug-ins are hard-coded into the Eclipse platform, and the platform knows to activate these plug-ins in each running instance of Eclipse. Non-core plug-ins, on the other hand, are activated when required by other plug-ins.

In the Eclipse model, a plug-in may be related to another plug-in by one of two relationships: dependency and an extension. With a dependency relationship, the roles in this relationship are dependent plug-in and prerequisite plug-in. A prerequisite plug-in supports the functions of a dependent plug-in. In an extension relationship, the roles in this relationship are host plug-in and extender plug-in. An extender plug-in extends the functions of a host plug-in. These relationships are specified declaratively in plug-in manifest files through the XML elements required and extension.

A non-core plug-in that has been deployed in an Eclipse installation may be activated in a running instance of Eclipse if it is transitively related to a core Eclipse plug-in by the union of the dependency and the extension relations. Such a plug-in will be activated when its functions are required to support or to extend the functions of another plug-in. A plug-in that is deployed but unreachable from any core plug-in via the dependency and extension relations might as well not be deployed from the point of view of plug-in activation. Even a reachable plug-in may remain unactivated in a running instance for some time (or for the lifetime of the instance) if no user action or other triggering event elicits its use.

An extension is defined by an extender plug-in and causes a host plug-in to modify its behavior. Typically, this modification of behavior includes the addition of processing elements to the host plug-in, and the customization of the behavior of these additional elements by services provided by the extender plug-in.

In simple cases, a single act of extension adds a single callback object to the environment, through which the host and extender plug-ins communicate, however, it could add more than one callback object to the environment. The callback object is different from the host and extender plug-in objects and, unlike these objects, which are components that are automatically instantiated and managed by the Eclipse platform, a callback object is a "plain old Java object" that is instantiated and managed specifically by provider-supplied code.

While Eclipse provides an extendible architecture in which components may be provided as plugins to a core set of services for creating IDEs, the plug-in based architecture has not, and cannot, be applied to the development of J2EE applications using known mechanisms. This is primarily because J2EE applications must be integrated into a single WAR file for deployment so that each component may have a single set of configuration data and be able to share resources. With the Eclipse architecture, the components are maintained as separate files.

Thus, it would be beneficial to have a method and apparatus that permits the extensibility of a plug-in based architecture, such as the Eclipse architecture, to be used with the development of J2EE applications. Moreover, it would be beneficial to have a method and apparatus for generating a single logical J2EE application from several individual components that act as a single, integrated application at runtime.

BRIEF SUMMARY OF THE INVENTION

The present invention provides a mechanism for providing a pluggable J2EE application development environment in which extensions of a J2EE application may be integrated into the J2EE application via extension points. The present invention provides mechanisms for defining extension points within modules of the J2EE application and mechanisms for defining plug-in or extension modules that may be integrated into the J2EE application via these extension points.

In addition, the present invention provides a mechanism for merging the plug-in or extension modules into the J2EE application at deployment so that all of the information necessary for generating instantiations of the plug-in or extension modules is integrated into the J2EE application configuration files. As a result, an integrated J2EE application is made possible from a modularized and extendable development of the J2EE application.

These and other features and advantages of the present invention will be described in, or will become apparent to those of ordinary skill in the art in view of, the following detailed description of the preferred embodiments.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an exemplary diagram illustrating a manifest file;

DETAILED DESCRIPTION OF THE INVENTION

The present invention provides a mechanism for generating Java 2 Enterprise Edition (J2EE) applications using an extensible plug-in architecture. Since the present invention permits componentized development of J2EE applications, these components may be developed by various development groups that may be centrally located or distributed over a plurality of locations. Thus, the components that may be combined using the present invention into a J2EE application may be obtained from various computing systems within a distributed data processing system or from the same computing system in which the components are combined to form a J2EE application. Furthermore, since the present invention is directed to development of J2EE applications in a componentized or plug-in based manner, the resulting J2EE application is likely to be deployed in a distributed data processing system. Accordingly, the following FIGS. 1-3 are intended to provide a background description of one exemplary computing environment in which aspects of the present invention may be implemented.

Figure 1:
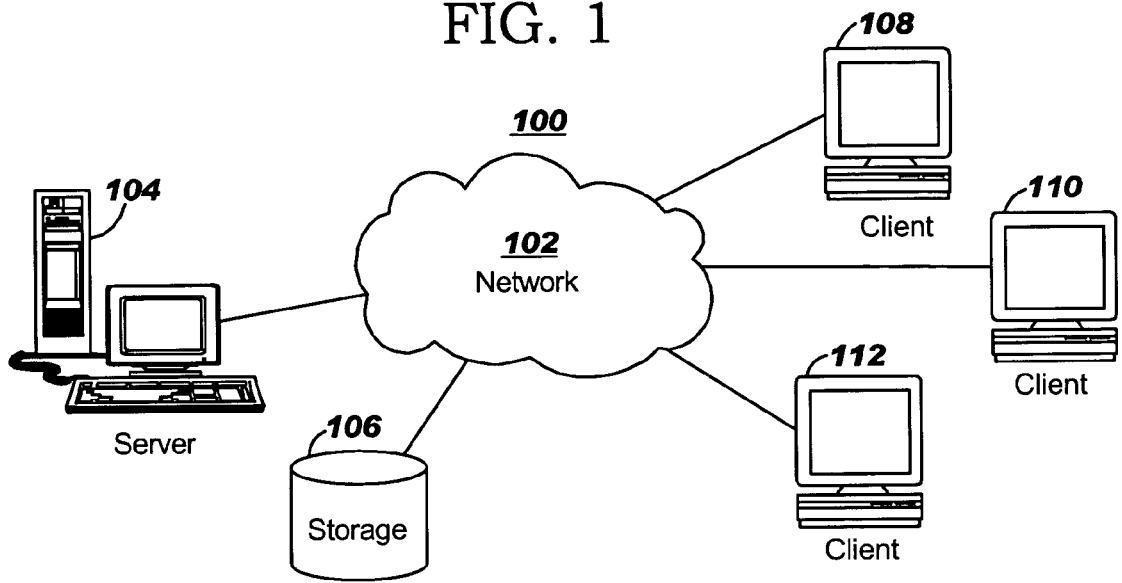
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
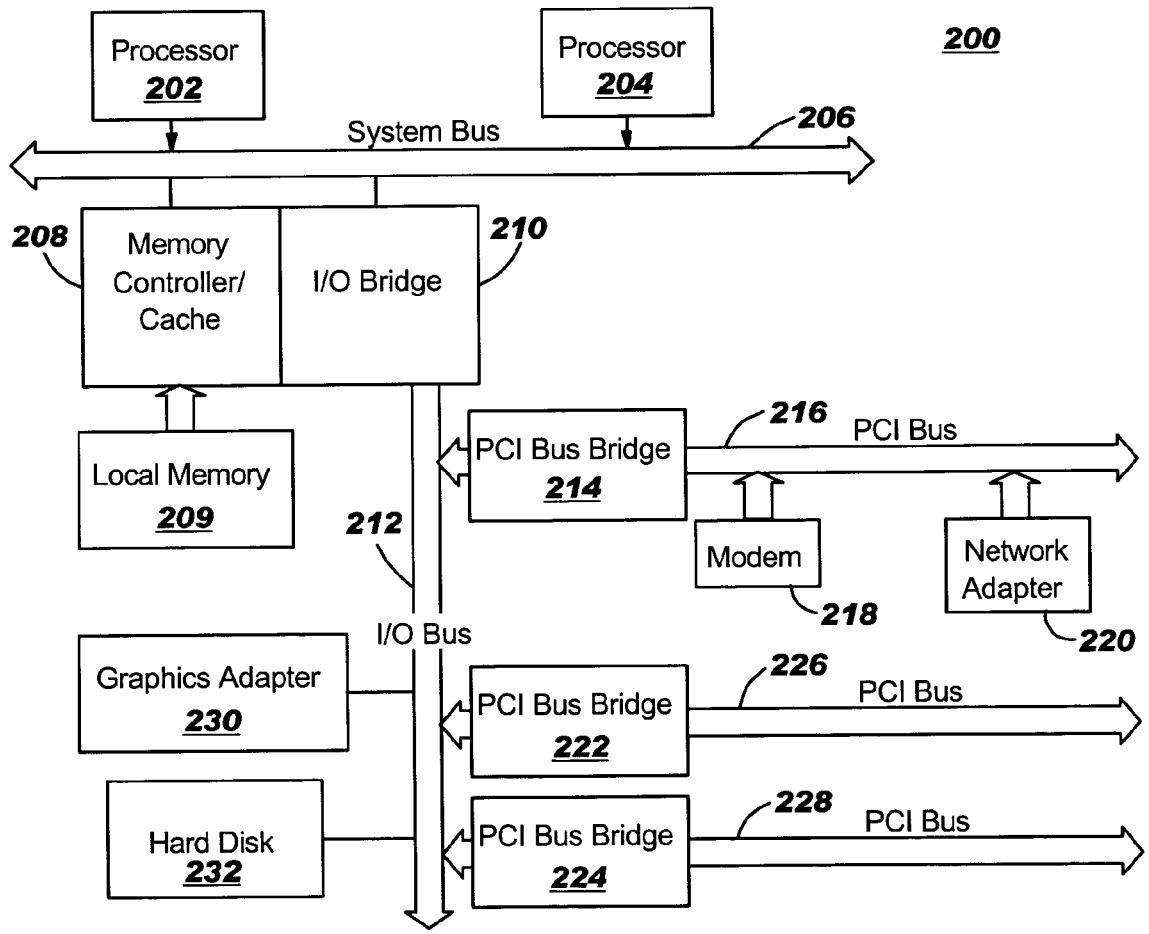
FIG. 2 is an exemplary diagram of a client computing device which may be used to send transactions to elements of the present invention.
Figure 3:
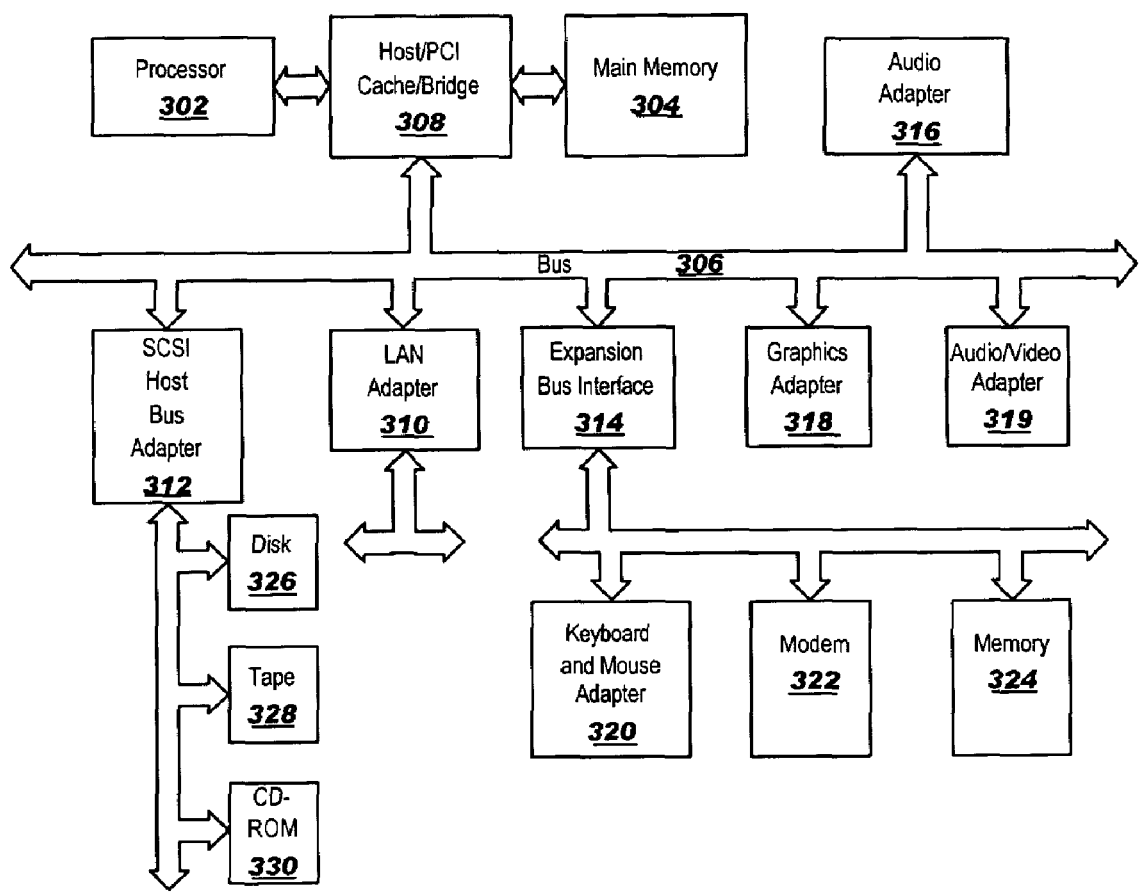
FIG. 3 is an exemplary diagram of a server computing device upon which elements of the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention permits components of a Java 2 Enterprise Edition (J2EE) application to be developed in a componentized or modular manner such that various components of the J2EE application may be developed independently from other components and then combined together into an integrated single J2EE application. The present invention further permits an established J2EE application to have its functionality extended by incorporation of newly developed components after an initial deployment of the J2EE application. The components of the J2EE application may be independently developed in a distributed manner such that components may be present on various computing devices, such as server 104 and clients 108, 110 and 112. The present invention permits components to be identified by Uniform Resource Identifier (URI) so that components stored on various computing devices may be integrated into a single J2EE application in a pluggable manner. These components on the various computing devices may then be combined into a single J2EE Web Archive (WAR) file so that an integrated J2EE application is generated for deployment and use at application runtime.

The extensible J2EE architecture of the present invention follows a modular design which allows it to be extended with new functionality, especially those outside of the core functionality. Each of these modules is defined as a pluggable unit, or plug-in, that is deployed into (or removed from) a J2EE enterprise application. A plug-in module describes how it provides its capabilities and uses other plug-in modules' capabilities through a manifest file associated with the plug-in. A plug-in's deployment package is a J2EE web module, e.g. a plug-in module WAR file, containing necessary classes, deployment descriptors, and the plug-in manifest file.

The extensibility architecture of the present invention is structured around the concept of extension points. Extension points, similar to that of the Eclipse architecture, are well-defined places in the J2EE application where plug-ins can contribute functionality. For example, in the presentation tier of a J2EE application, adding task menus, form elements such as buttons and links to existing panels, can be potentially deployed as extension points. Plug-ins can define their own extension points so that other plug-ins can integrate with them or simply add extensions to the extension points of other plug-ins.

Figure 4:
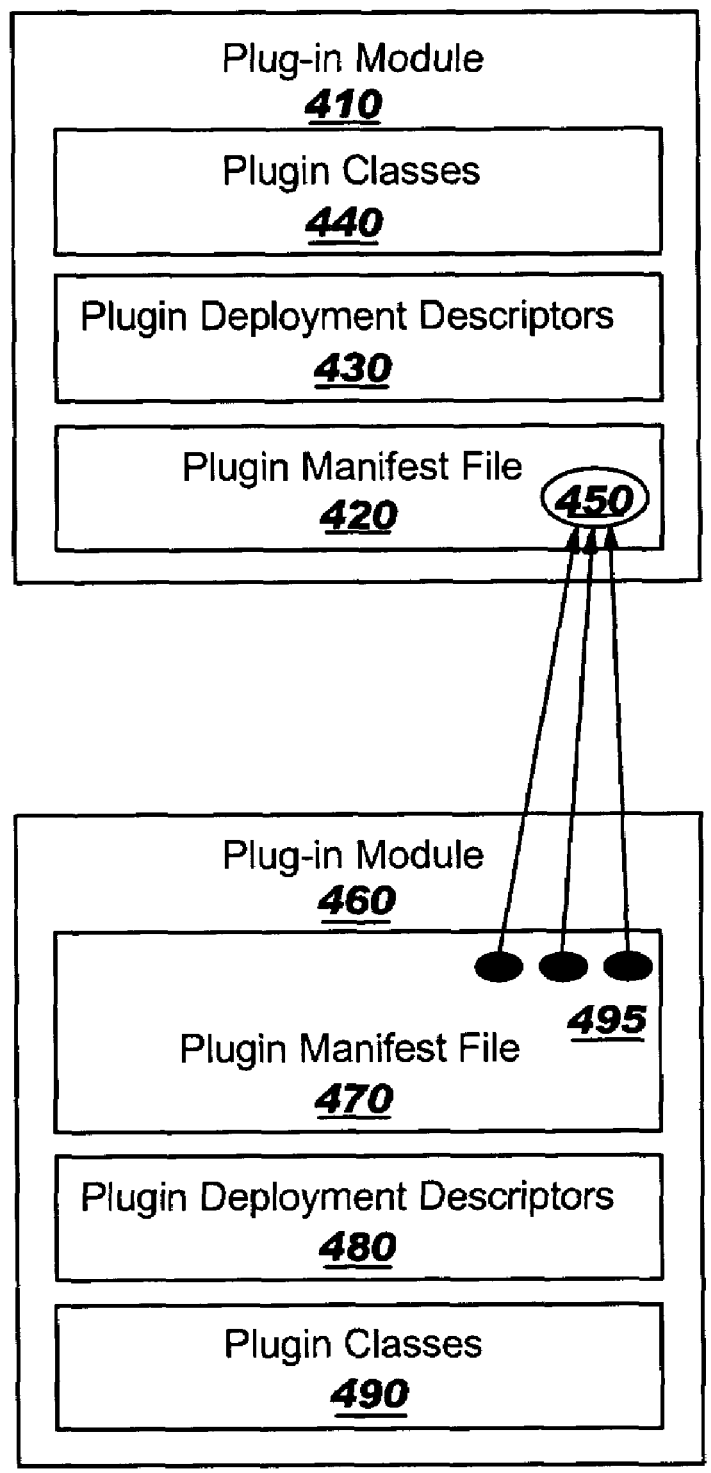
FIG. 4 is an exemplary diagram of a plug-in module in accordance with one exemplary embodiment of the present invention.

FIG. 4 is an exemplary diagram of a plug-in module in accordance with one exemplary embodiment of the present invention. As shown in FIG. 4, the plug-in module 410 includes a plug-in manifest file 420, deployment descriptors 430 for the plug-in 410, and various classes 440 for the plug-in 410.

The plug-in manifest file 420 is a file that describes the way in which the plug-in module 410 provides its functionality and uses the functionality of other plug-in modules. The manifest file 420 may be formatted in any known manner. In a preferred embodiment, the manifest file 420 is formatted as an Extensible Markup Language (XML) file that is parsed during deployment of the plug-in module 410 to generate configuration information for integration into a configuration file of the resulting J2EE application WAR file.

The deployment descriptors 430, as is generally known in the art, identifies the manner by which the corresponding plug-in module 410 will be deployed in the J2EE application. The deployment descriptors may be, for example, XML files used to configure runtime properties of the J2EE application.

The classes 440 provide the actual class definitions for the plug-in module 410 defining the methods implemented by the plug-in module 410. These classes 440 are instantiated as objects when the J2EE application is deployed in the runtime environment. The instantiation of these classes 440 provides the actual objects used by the runtime environment when executing the J2EE application.

As shown in FIG. 4, the plug-in manifest file 420 may define an extension point 450 through which the functionality of the plug-in module 410 may be extended using the functionality of one or more other plug-in modules, such as plug-in module 460. The extension point 450 is defined in the plug-in manifest file 420 by way of an extension point declaration. The extension point declaration includes the specification of a schema to which users of the extension point, i.e. extensions, must conform. That is, the extensions are required to contribute data to the extension point by providing fragments containing data in a format that conforms to the schema defined in the extension point. Both the schema of the extension point and the fragments provided by the extensions may be in XML, for example. Thus, the schema acts as a "protocol" by which data may be provided to a component, e.g., plug-in module 410, that implements the extension point 450.

As shown in FIG. 4, in addition to defining extension points in the plug-in manifest file 420, the plug-in manifest file 470 may define one or more extensions 495 for extending the functionality of other plug-in modules. In the depicted example, the plug-in manifest file 470 defines three extensions 495 of the extension point 450 in plug-in module 410. For example, these extensions may be three different drop down menus of a tool defined by plug-in module 410. All three of these menus may conform to the schema defined by the extension point 450. As a result, the functionality of the plug-in module 410 is extended by the functionality of plug-in module 460 through the use of extension point declarations and extensions set forth in the repsective plug-in manifest files 420 and 470 of plug-in modules 410 and 460.

It should be appreciated that while FIG. 4 illustrates the ability to extend the functionality of a plug-in module with the functionality of another plug-in module, the same methodology and mechanisms may be used to extend the functionality of the core J2EE application components. That is, for example, a J2EE application component may define an extension point with a plug-in manifest file for a corresponding plug-in module defining an extension of that extension point. As a result, the core components of the J2EE application may be extended using plug-in modules and the plug-in modules themselves may be extended with other plug-in modules.

The present invention, when deploying the J2EE application merges the plug-in module's manifest file, deployment descriptors and classes into an application file for the application. In this way, although the plug-in modules may have been developed in a modular fashion, they are combined into a single application file and thus, can share resources. This merging of the plug-in module's components includes the copying over of the classes and deployment descriptors and the integration of the manifest file into a configuration file of the application. The merging of plug-ins to a J2EE application is referred to herein as registering the plug-ins with the J2EE application.

There are two preferred implementations provided to support registration of plug-ins with a J2EE application: one that is static and one that is dynamic. In the static methodology, the contents of the plugin manifest file are transformed into a format expected in the contents of the configuration files used to render the extensions of a particular extension point. For example, XSL transformation (XSLT) may be used to convert the manifest file into content for a configuration file of the J2EE application.

Each extension point in the J2EE application is associated with a processor which is responsible for performing the transformation of the manifest as well as inserting the transformed content into the configuration files required to render the extensions of that extension point. The "processor" associated with the extension point is a conversion mechanism that parses corresponding code, generates elements of the code, and then converts these elements to a different format using a conversion schema. For example, the extension points may be associated with an "XSLT processor," which transforms the input plug-in manifest file based on XSLT and XSL codes in the manifest file. The XSLT processor may use an "XML parser" to separate the XML elements in the manifest file into a tree structure before it manipulates them to generate configuration file information.

Since this registration mechanism essentially merges configuration content at plug-in deployment, at application runtime, all information that was contained in the plug-in manifest files is available to the J2EE application as static content from its own configuration files.

As a result, in order to remove a plug-in from the application, the transformed content that was inserted into the configuration files must also be identified and removed. Thus, for removal of a plug-in from a J2EE application, the manifest file for the plug-in may be converted to a configuration file format and a search of the configuration file for corresponding entries may be made. Matching configuration file entries may then be removed from the configuration file and the plug-in's classes and deployment descriptors may also be removed from the J2EE application file.

With the dynamic plug-in registration methodology, a plug-in registry service may be provided and used to store and retrieve the contents of plug-in manifests. With such an embodiment, the content of the manifests need not be transformed and merged with the static content of the J2EE application. To the contrary, the plug-in registry service may be provided as a Java object bound by Java Naming and Directory Interface (JNDI) that contains all content defined in the plug-in manifests of all plug-ins of the J2EE application. The plug-in registry object may be the root object in the plug-in registry application program interface (API) that is provided to query information about plug-ins. The plug-in registry API may provide core support for plug-ins and the plug-in registry.

In general, the registry models each of the primary elements of the plug-in manifest, providing methods to access the attributes and any parent/child relationships developers will need to lookup for extension points and extensions dynamically at runtime. An important feature of the plug-in registry API is that its usage is not dependent upon any specific external technologies, such as Java Server Pages (JSPs), servlets, etc. The methods in the API can be used identically regardless of the type of technology that is using it. Using this mechanism, removal of a plug-in from an application involves simply removing the plug-in's entry in the plug-in registry.

As previously mentioned, the plug-in modules may be located in distributed computing systems and thus, may be stored in remotely located computing devices. The present invention permits the use of Uniform Resource Identifiers (URIs) to identify these plug-in modules for integration into the J2EE application.

Figure 5:
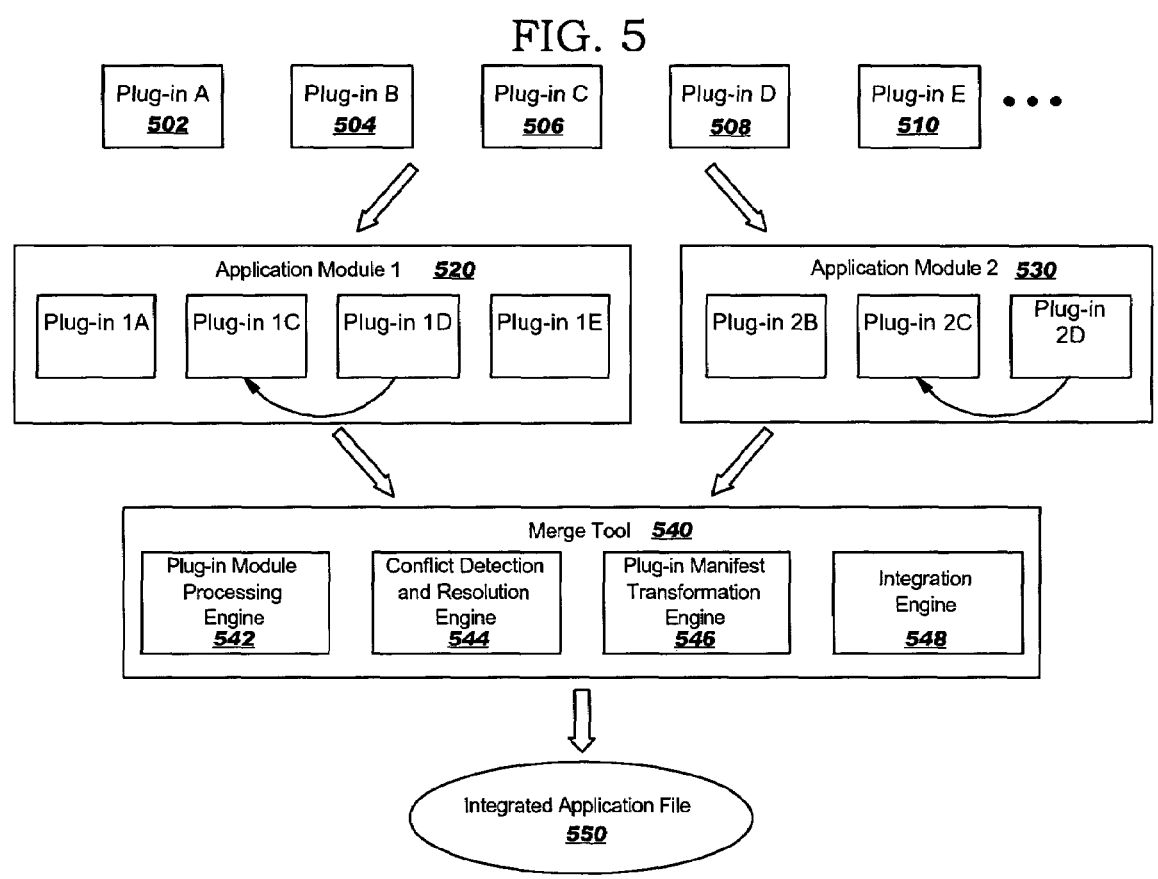
FIG. 5 is an exemplary diagram illustrating a process of generating an integrated application file in accordance with the present invention.

FIG. 5 illustrates a process of generating an integrated application file in accordance with one exemplary embodiment of the present invention. The example shown in FIG. 5 makes use of the static registration mechanism for plug-ins discussed above.

As shown in FIG. 5, a plurality of plug-in modules 502-510 are provided for use in an exemplary J2EE development project. The project may be divided into modules that are to be developed independently by different development teams. Two such modules 520 and 530 are illustrated.

As shown, the development team of the first module 520 has developed the module 520 such that it makes use of a first set of the plug-in modules 502-510 while the development team of the second module 530 has developed the module 530 to make use of a second set of the plug-in modules 502-510. For example, in application module 520, the developers have generated the core module application with extension points identifying schema adopted by plug-in 1A, plug-in 1C and plug-in 1E. In addition, plug-in 1C has an extension point whose schema is adopted by plug-in 1D. Plug-in modules 1A, 1C, 1D and 1E are copies of plug-in modules 502, 506, 508 and 510, respectively.

Similarly, application module 530 has copies of plug-in modules 504, 506 and 508 referred to as plug-ins 2B, 2C and 2D, respectively. Plug-in module 2C has an extension point whose schema is adopted by plug-in 2D.

The module data for modules 520 and 530 are provided to a merge tool 540 which merges the plug-in modules with the core application modules 520 and 530 and then merges the application modules 520 and 530 into an integrated application file 550. The merge tool 540 includes a plurality of engines for facilitating this merging of plug-ins and modules including a plug-in module processing engine 542, a conflict detection and resolution engine 544, a plug-in manifest transformation engine 545, and an integration engine 548.

The plug-in module processing engine 542 parses the modules 520 and 530 to identify extension points and their schema. The plug-in module processing engine 542 also parses the manifest files of the plug-in modules to identify the extension points to which extensions defined by the manifest file refer. The plug-in module processing engine 542 then verifies that extensions defined in the manifest files of the plug-in modules correctly implement the schema defined by the extension point to which it refers. As described above, the extension points may be in the core application module or may be in plug-in modules associated with the core application module.

If a plug-in module defines an extension of an extension point and the plug-in module fails to properly implement the schema defined by the extension point, an error notification may be generated by the plug-in module processing engine 542 and either added to an error log or sent to a user to inform them of the problem so that it can be rectified.

The plug-in manifest transformation engine 546 converts the manifest file associated with the plug-in modules of the application modules 520 and 530 into corresponding configuration file information for inclusion in one or more configuration files of the integrated application file 550. The particular conversion is implementation dependent. That is, the conversion will be different depending upon the particular format selected for generating the manifest file and the configuration file format to which it is being converted. In an exemplary embodiment, an Extensible Stylesheet Language Transformation (XSLT) mechanism may be used to convert manifest files that are created using XML into a J2EE WAR configuration file format. XSLT is generally known in the art and thus, a detailed description of its operation is not included herein.

The actual merging of the plug-in modules with the application modules 520 and 530 and the merging of the application modules 520 and 530 are performed using the conflict detection and resolution engine 544 and the integration engine 548. These engines operate in a similar manner to the mechanism described in commonly assigned and co-pending U.S. patent application Ser. No. 10/721,818 entitled "Web Application Development Tool," filed on Nov. 24, 2003, and hereby incorporated by reference.

As described in co-pending U.S. patent application Ser. No. 10/721,818, the integration engine 548 may receive the data for the plug-in modules and the application modules 520-530 and determine which modules are independent and do not correspond to any other resource in a different module. The independent modules are processed by the integration engine 548 and packaged into the integrated application file 550. The remaining modules are determined to be dependent, i.e. are each related to another module. Thus, for example, plug-ins 1A, 1E and 2B are all independent modules, i.e. modules that are self contained and are not dependent upon core modules or other plug-in modules. Thus, the manifest files of these plug-ins are processed by the plug-in module processing engine 542 and the plug-in manifest transformation engine 546 and the plug-in module classes, deployment descriptors, and configuration information are added to the integrated application file 550.

Plug-ins 1C, 1D, 2C and 2D are all dependent plug-in modules, i.e. modules whose functionality depends from core modules or other plug-in modules such that an order of processing the plug-in modules is determined based on their dependency. Thus, a conflict check between these plug-in modules is performed prior to integrating them into the integrated application file 550. That is, the conflict detection and resolution engine 544 compares the plug-in modules to their related plug-in modules to make sure that there are no conflicts between the plug-in modules. If no conflicts are present, then the plug-in modules are processed by engines 542 and 546 so that their classes, deployment descriptors, and configuration information are added to the integrated application file 550.

If a conflict is encountered during this conflict check, the conflict detection and resolution engine 544 determines if the conflict is a major conflict or a minor conflict. The determination of whether a conflict is a major conflict or a minor conflict is dependent upon the particular implementation. One example of a minor conflict may be duplicate messages in Java property bundles (since this will not cause a problem at runtime, the first entry found in the file is used, this conflict is designated a minor conflict). An example of a major conflict may be a circular dependency, e.g., module A depends on/requires module B and module B depends on/requires module A (because the order to process these plug-ins cannot be resolved, this is determined to be a major conflict).

If the conflict is a minor one, an error log may be generated and/or a notification may be sent to a user so that the problem may be rectified. The notification may permit the user to select a way in which to rectify the error, such as selecting which information to use so that the conflicting information is disregarded.

If the conflict is irreconcilable, i.e. is a major conflict, the user may be notified with an error message allowing the user to decided how to proceed. Alternatively, the merging process may be aborted, giving the development teams an opportunity to resolve the conflict by revising one or both of the conflicting modules.

After conflicts have been resolve, the modules may be merged and packaged into the integrated application file 550. The integrated application file 550, which in a preferred embodiment is a J2EE application WAR file, may then be installed into an application server as a deployed application, such as a J2EE application server as a J2EE application.

Figure 6:
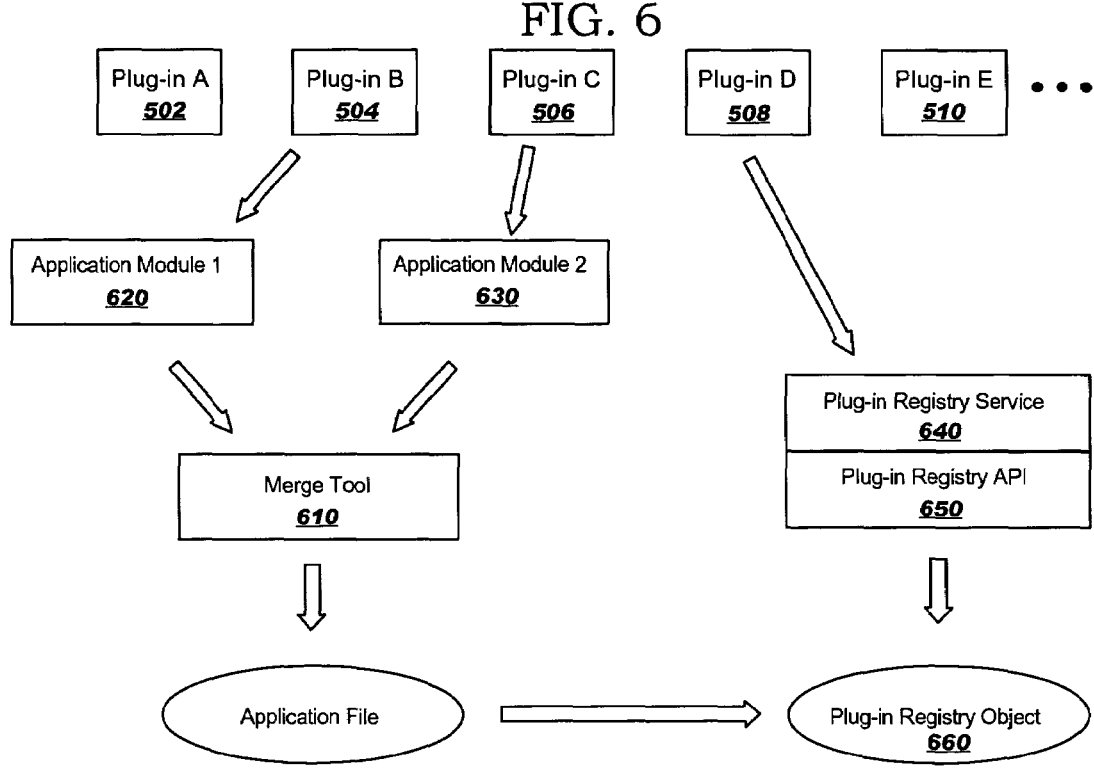
FIG. 6 is an exemplary diagram of the primary operational components of a dynamic plug-in registration embodiment of the present invention.

As described above, much of the processing of the present invention is centered around the plug-in manifest file that describes the manner by which the plug-in provides its functionality and uses the functionality of other plug-in modules. FIG. 6 is an example of such a manifest file that may be used in conjunction with the present invention.

FIG. 6 shows the primary operational components of a dynamic plug-in registration embodiment of the present invention. The primary difference between FIG. 5 and FIG. 6 is that the merge tool 610 is used simply to merge modules 620 and 630 and does not contain facilities for merging the plug-in modules. That is, the merge tool 610 operates in the manner described in the co-pending U.S. patent application Ser. No. 10/721,818.

In order to handle the plug-ins of the present invention, an additional plug-in registry service 640 and plug-in registry API 650 are provided. The plug-in registry service 640 stores and retrieves the contents of the plug-in module manifest files. The content of the manifest files is not transformed and merged with the static content of the application. To the contrary, the plug-in registry service 640 generates a plug-in registry object 660 that contains all the content defined in the plug-in manifest files of the application. The plug-in registry object is the root object in the plug-in registry API 650. The plug-in registry API 650 contains methods for querying information about the plug-ins represented by the plug-in registry object 660.

The plug-in registry API 650 provides core support for plug-ins and the plug-in registry service 640. The plug-in registry service 640 models each of the primary elements of the plug-in manifest files providing methods to access the attributes and any parent/child relationships developers will need to lookup for extension points and extensions dynamically at runtime. The plug-in registry API 650 is independent of the specific external technologies used to access it. At application initialization during the startup of the application, the application accesses this runtime plug-in registry service 640 via JNDI to determine what content can be displayed in the presentation layer by querying the registry for the lists of extension points and extenders of those extension points.

As shown in FIG. 7, the manifest file 700 includes a first portion 710 that defines the plug-in and many of its attributes. For example, the first portion 710 may define the name of the plug-in, an identifier of the plug-in, such as a URI or other type of identifier, version information, vendor-name information, whether the plug-in is embedded or not, i.e. whether or not the plug-in module uses an extension point that is dependent upon core module components (non-embedded plug-in modules use extension points but are not dependent on the core module functionality), and the context root of the plug-in (this is used to prefix the files from an embedded plug-in module so they can be identified and so there are no name collisions between files provided by different plug-in modules).

A second portion 720 of the manifest file 700 includes a designation of an extension point to which this plug-in is an extension. As shown, the second portion 720 identifies the plug-in and version information associated with a plug-in extension point to which this plug-in may be an extension. In addition, the degree of matching between the plug-in and the attributes of an extension point is necessary for this plug-in to be an extension of the extension point.

A third portion 730 describes any extension points that are being provided by this module. As shown, the third portion 730 defines the type of extension, i.e. a plug-in extension, having a particular version, and the degree to which the plug-in must match the designated plug-in version. In addition, the third portion 730 identifies the name of the extension point, an identifier of the extension point, and an associated schema. Thus, the third portion 730 describes what, if any, dependencies there are between this and any other extension modules.

A fourth portion 740 of the manifest file 700 defines the extension associated with an extension point to which this manifest file 700 points. That is, the fourth portion 740 indicates that the plug-in associated with the manifest file 700 defines an extension of an extension point in another manifest file. This other extension point is identified in the fourth portion 740 of the manifest file 700 by point, id and name identifiers. The point may be the fully qualified ID of the extension point that is being extended. The id is an optional ID to use for this usage of the extension point. The name is an optional name to use for this usage of the extension point.

A plug-in manifest file such as that illustrated in FIG. 7 may be parsed by the merge tool in order to determine that extensions defined in a plug-in correspond to an associated extension point schema, to determine and resolve conflicts, and the generate configuration information to be merged into an integrated application file's configuration files, as described previously. Alternatively, the manifest files such as that illustrated in FIG. 7 may be used by a plug-in registry service to model the plug-in elements for dynamic integration with an application.

Figure 8:
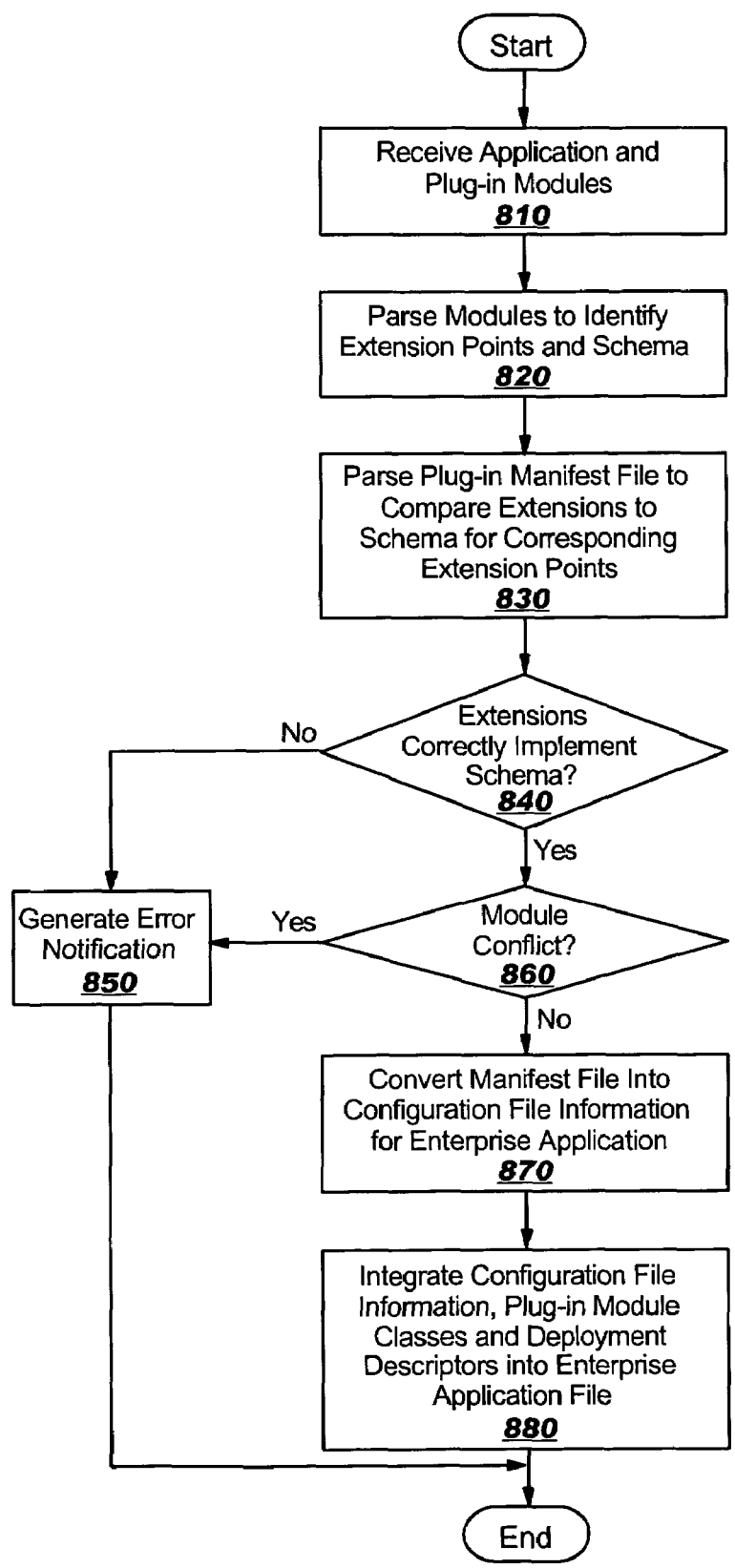
FIGS. 8 and 9 are exemplary diagrams of flowcharts that illustrate operations for integrating plug-in modules into an enterprise application in accordance with exemplary aspects of the present invention.
Figure 9:
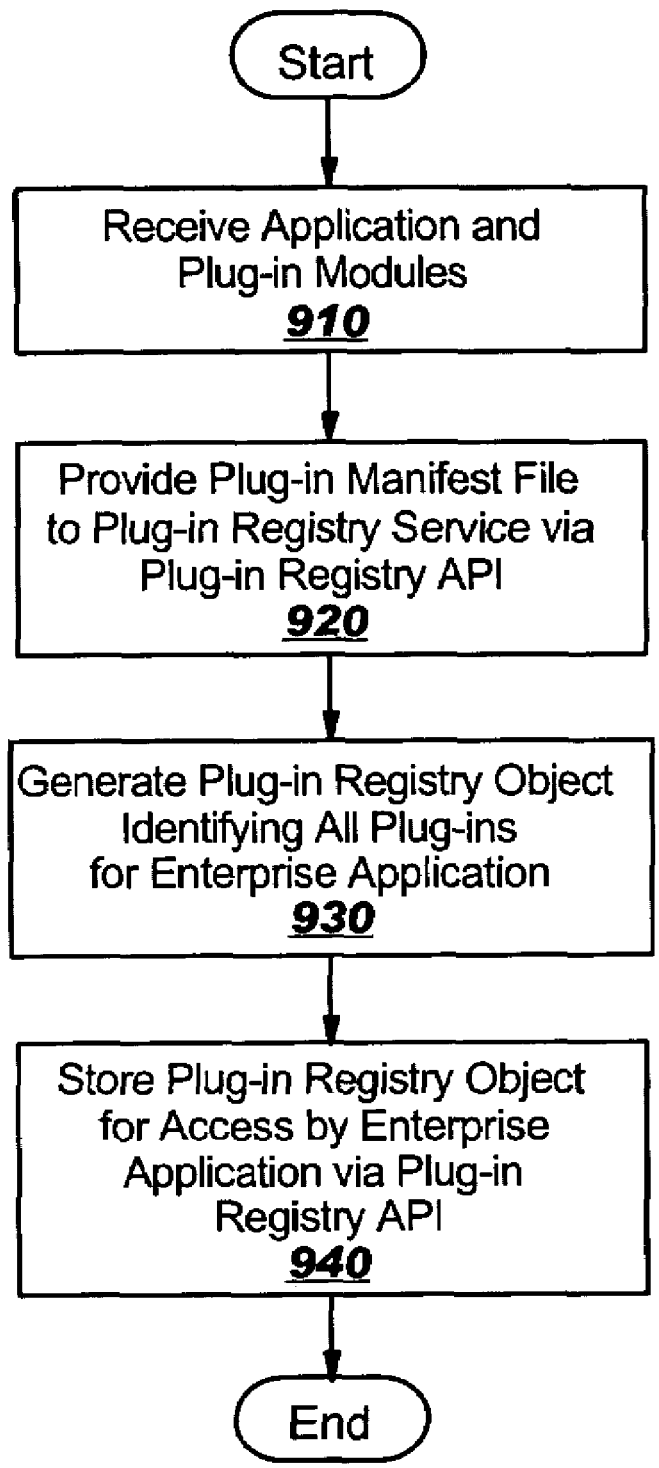

FIGS. 8 and 9 are flowcharts that illustrate operations for integrating plug-in modules into an enterprise application, such as a J2EE application, in accordance with exemplary aspects of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 8 is a flowchart outlining an exemplary operation for statically merging a plug-in module into an enterprise application in accordance with one exemplary embodiment of the present invention. As shown in FIG. 8, the operation starts by receiving the application modules and the plug-in module (step 810). The application modules and plug-in module are parsed to identify the extension points and their corresponding schema (step 820). The manifest file associated with the plug-in module is then processed to determine if any extensions in the plug-in module correctly implement the schema of their corresponding extension points (step 830). If an extension does not correctly implement a corresponding extension point schema (step 840), then an error notification is generated (step 850).

If the extension point schemas are properly implemented for all of the extensions in the plug-in module, then a conflict check is made to determine if the plug-in module conflicts with any other modules in the application (step 860). If so, an error notification may be generated (step 850). Otherwise, the manifest file of the plug-in module is converted to configuration file information (step 870). The configuration file information, classes of the plug-in module, and the deployment descriptors for the plug-in module are then integrated into the application file (step 880) and the operation terminates. This process may be repeated or performed in parallel for each plug-in module of the enterprise application.

FIG. 9 is a flowchart outlining an exemplary operation for dynamically integrating plug-in modules into an enterprise application in accordance with one exemplary embodiment of the present invention. As shown in FIG. 9, the operation starts by receiving the application modules and the plug-in module (step 910). The plug-in module manifest file is provided to a plug-in registry service via a plug-in registry API (step 920). The plug-in registry service generates a plug-in registry object that identifies all of the plug-ins for the enterprise application (step 930). The plug-in registry object is then stored for accessing by the enterprise application via the plug-in registry API (step 940). The operation then terminates.

Thus, the present invention provides a mechanism for extending the functionality of enterprise applications, such as J2EE applications, in a pluggable manner. The present invention provides an architecture that facilitates the componentized or modularized development of enterprise applications in such a manner that the components or modules may be integrated into a single enterprise application at deployment time. In this way, while the components or modules are developed independently, at runtime, they will function in an integrated manner and may share resources as if they were all developed in a single location by a single development team.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for deploying an enterprise application into a runtime environment, comprising:

identifying at least one extension point in a module of the enterprise application;

identifying at least one plug-in module in a plurality of plug-in modules defining extensions of the at least one extension point, wherein the at least one plug-in module in the plurality of plug-in modules is an extension of another one of the plurality of plug-in modules, wherein the at least one plug-in module provides extended functionality to the enterprise application thereby permitting the enterprise application to perform functions that it could not perform prior to integration of the at least one plug-in module, wherein the at least one plug-in module is identified in the configuration information based on a Uniform Resource Identifier associated with the at least one plug-in module, wherein a schema is associated with each extension point, and wherein a plug-in module conforms to the schema of an extension point in order to extend the functionality of the enterprise application using the extension point; and integrating the at least one plug-in module into the enterprise application based on configuration information associated with the at least one plug-in module and the at least one extension point, wherein integrating the at least one plug-in module into the enterprise application further comprises:

processing at least one manifest file associated with the at least one plug-in module to generate configuration information for the at least one plug-in module, wherein the manifest file is an extensible markup language file that identifies the functionality of the plug-in module and identifies the extension point through which the plug-in module may be extended;

merging the configuration information for the at least one plug-in module into at least one configuration file of the enterprise application; and packaging the at least one plug-in module into a web archive file associated with the enterprise application.

2. A computer program product in a computer recordable-type medium for deploying an enterprise application into a runtime environment, comprising:

instructions for identifying at least one extension point in a module of the enterprise application;

instructions for identifying at least one plug-in module in a plurality of plug-in modules defining extensions of the at least one extension point, wherein the at least one plug-in module in the plurality of plug-in modules is an extension of another one of the plurality of plug-in modules, wherein the at least one plug-in module provides extended functionality to the enterprise application thereby permitting the enterprise application to perform functions that it could not perform prior to integration of the at least one plug-in module, wherein the at least one plug-in module is identified in the configuration information based on a Uniform Resource Identifier associated with the at least one plug-in module, wherein a schema is associated with each extension point, and wherein a plug-in module conforms to the schema of an extension point in order to extend the functionality of the enterprise application using the extension point; and instructions for integrating the at least one plug-in module into the enterprise application based on configuration information associated with the at least one plug-in module and the at least one extension point, wherein integrating the at least one plug-in module into the enterprise application further comprises:

instructions for processing at least one manifest file associated with the at least one plug-in module to generate configuration information for the at least one plug-in module, wherein the manifest file is an extensible markup language file that identifies the functionality of the plug-in module and identifies the extension point through which the plug-in module may be extended;

instructions for merging the configuration information for the at least one plug-in module into at least one configuration file of the enterprise application; and instructions for packaging the at least one plug-in module into a web archive file associated with the enterprise application.

3. An apparatus for deploying an enterprise application into a runtime environment, the apparatus comprising:

a bus;

a storage device connected to the bus, wherein computer usable code is located in the storage device;

a processing unit connected to the bus, wherein the processing unit executes the computer usable code to identify at least one extension point in a module of the enterprise application; identify at least one plug-in module in a plurality of plug-in modules defining extensions of the at least one extension point, wherein the at least one plug-in module in the plurality of plug-in modules is an extension of another one of the plurality of plug-in modules, wherein the at least one plug-in module provides extended functionality to the enterprise application thereby permitting the enterprise application to perform functions that it could not perform prior to integration of the at least one plug-in module, wherein the at least one plug-in module is identified in the configuration information based on a Uniform Resource Identifier associated with the at least one plug-in module, wherein a schema is associated with each extension point, and wherein a plug-in module conforms to the schema of an extension point in order to extend the functionality of the enterprise application using the extension point; and integrate the at least one plug-in module into the enterprise application based on configuration information associated with the at least one plug-in module and the at least one extension point, wherein integrating the at least one plug-in module into the enterprise application further comprises executing computer usable code to process at least one manifest file associated with the at least one plug-in module to generate configuration information for the at least one plug-in module, wherein the manifest file is an extensible markup language file that identifies the functionality of the plug-in module and identifies the extension point through which the plug-in module may be extended; merge the configuration information for the at least one plug-in module into at least one configuration file of the enterprise application; and package the at least one plug-in module into a web archive file associated with the enterprise application.

* * * * *